2-17-1874
Re 5,766
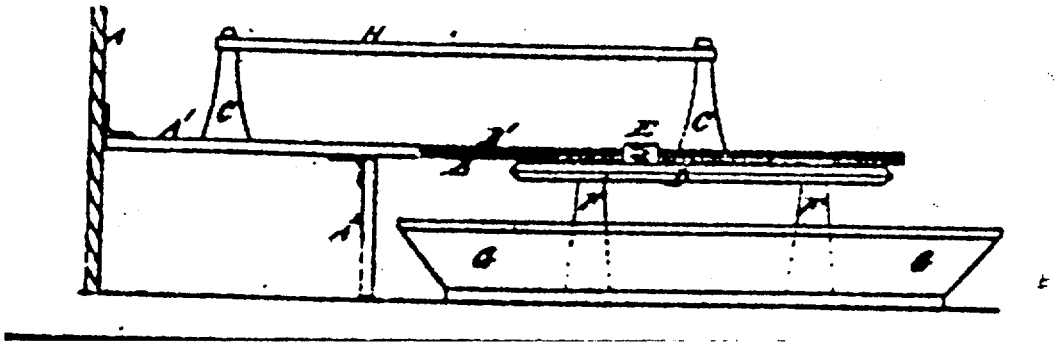

UNITED STATES PATENT OFFICE.

NATHANIEL WESTON, OF SAN FRANCISCO, CALIFORNIA.

IMPROVEMENT IN APPARATUS FOR ENAMELING PHOTOGRAPHS.

Specification forming part of Letters Patent No. 72,138, dated December 10, 1867; reissue No. 5,085, dated October 1, 1872; reissue No. 5,766, dated February 17, 1874; application filed January 7, 1874.

*To all whom it may concern:*

Be it known that I, NATHANIEL WESTON, of the city of San Francisco, in the county of San Francisco and State of California, have invented certain new and useful Improvements in an Apparatus for Enameling Cards, Pictures, &c.; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention relates to an improved apparatus for enameling pictures, cards, and other surfaces of thin plates, cards, or paper.

Before my improved apparatus was devised this work of enameling was performed by laying the card or sheet to be enameled face upward upon a block, which was usually supported in a tray, which served to catch the surplus or overflowing enamel or gluten. After the enamel was poured upon the card or picture, a glass plate was pressed upon the upper surface of the card, so as to spread the enamel or gluten uniformly over the card or plate surface. This glass plate was held in position by hand until the enamel or gluten sets sufficiently to permit of its being removed from the block, after which a weight was placed upon the glass to preserve the pressure until the enamel should become hard. The block upon which the picture, card, or plate was placed would soon warp, so as to make its surface uneven, thus leaving spots or portions of the enameled surface thicker than others, owing to the impossibility of obtaining an equal pressure upon all parts of the card, and, besides, the process, as then conducted, required the attention of two persons to perform it correctly.

My improvement consists in the employment of two plates, the upper one of which must be of glass, while the lower one can be of metal, glass, or other thin substance, between which the picture, card, print, or sheet is pressed, and also in the employment of two clamps for binding the two plates together with the card between them, while the enamel is hardening, instead of the weight heretofore used. I also provide a convenient rest for steadying the glass plates while pressing them together, so that one person can perform the labor instead of two.

In order to more fully illustrate and explain my invention, reference is had to the accompanying drawings forming a part of this specification, in which—

Figure 1 is a side view of my invention. Fig. 2 is a plan view.

G is the tray, inside of which the four blocks or supporting-legs F are placed, and D is the block which is placed upon and supported by the blocks or legs F. B is the thin plate, which I place upon the block D. This plate can be made of glass, metal, or other material that will not warp or bend readily. The card, sheet, or plate to be enameled being placed upon the plate B face uppermost, and the gluten or enamel poured upon it, I place the plate B′ upon the card, and, by pressing upon it, spread the enamel out thinly and evenly over the surface of the card. $A^1$ is a horizontal board, which is hinged at one end to a wall, A, or other upright, and which is provided with a hinged leg, $A^2$, so that the whole may be turned up against the wall, out of the way, when it is not needed, and let down when it is required for use. Any form of rest, such as a fixed standard, or the wall of a room, can be used in place of the hinged board. While pressing upon the upper glass B′, in order to spread the enameling substance, the plates are steadied by placing the edge of the upper glass against the edge of the horizontal board $A^1$, thus preventing it from slipping upon the picture, which would spoil the finish, and consequently the card.

By using the rest, the services of one man are dispensed with, as heretofore one person was required to steady the glass while the other pressed down upon it. The hinged board or rest A, with its leg $A^2$, can be dispensed with when the weather is warm, as the enamel substance will set soon enough to avoid the necessity of a steadying mechanism; but in cold weather, when the enameling substance chills quickly, the rest is necessary. When the enameling substance has been properly spread by pressing, I take two or more clamps, E E, similar to clothes-pins, and clamp them upon the plates opposite each other, so as to hold the plates together with the picture, card, or print between them. The plates can then be placed to one side, and allowed to remain until the enamel is hard. C C are two weights, which will be used in cold weather when the plates require to stand awhile, in order to let the enamel harden. One of these weights is placed on the board A, and the other on the upper plate B′. An elastic band, H, then unites the two weights, so as to keep the edges of the plates against the edge of the board A while the clamps are being applied.

The chief feature of my invention consists in the employment of the two plates between which the print or picture is pressed so as to insure a uniform surface, and prevent air-spots and blisters, and the clamps for holding them together, the other parts being used as necessity requires.

Having thus described my invention, what I claim, and desire to secure by Letters Patent, is—

1. The combination of the two plates B B′ and clamps E E, substantially as and for the purpose above described.

2. The combination of the hinged board $A^1$, hinged leg $A^2$, or equivalent rest, with the tray G, post F, block D, and plates B B′, substantially as and for the purpose above described.

3. The combination of the plates B B′ with the board $A^1$, having hinged leg $A^2$, or equivalent device, substantially as and for the purpose described.

In testimony that I claim the foregoing I have hereunto set my hand and seal this 6th day of September, 1873.

NATHANIEL WESTON. [L. S.]

Witnesses:
F. O. WEGENER,
C. MILTON RICHARDSON.